United States Patent [19]

Alster

[11] Patent Number: 4,614,868

[45] Date of Patent: Sep. 30, 1986

[54] FIBER OPTIC SEAM TRACKING APPARATUS

[75] Inventor: Louis G. Alster, Morton, Ill.

[73] Assignee: Caterpillar Industrial Inc., Peoria, Ill.

[21] Appl. No.: 660,354

[22] Filed: Oct. 12, 1984

[51] Int. Cl.[4] .......................... H01J 5/16; H01J 40/14
[52] U.S. Cl. .......................................... 250/227; 356/1
[58] Field of Search .............. 250/227, 560, 561, 234; 356/1; 350/96.1, 96.25

[56] References Cited

U.S. PATENT DOCUMENTS

| | | | |
|---|---|---|---|
| 4,208,589 | 6/1980 | Dashwood et al. | 250/560 |
| 4,340,302 | 7/1982 | Oku | 250/227 |
| 4,409,477 | 10/1983 | Carl | 250/227 |
| 4,450,339 | 5/1984 | Corby, Jr. | 219/124.34 |
| 4,473,750 | 9/1984 | Oshida et al. | 250/560 |

Primary Examiner—David C. Nelms
Assistant Examiner—William L. Oen
Attorney, Agent, or Firm—Terry D. Morgan

[57] ABSTRACT

An arc welding head suitable for robotic welding has a fiber optic bundle and remotely located laser light source which is imaged onto an end of the fiber optic bundle and optically linked to substantially a single fiber of the fiber optic bundle. The light source is then repetitively scanned across the coherent arrangement of fibers within the bundle, such that, a substantial portion of the transmitted light will be sequentially delivered to each individual fiber within a row of fibers and subsequently delivered to a workpiece. This arrangement provides a high signal to noise ratio making the laser light reflected from the workpiece easily distinguishable from the optical "noise" generated by the welding arc flash.

7 Claims, 5 Drawing Figures

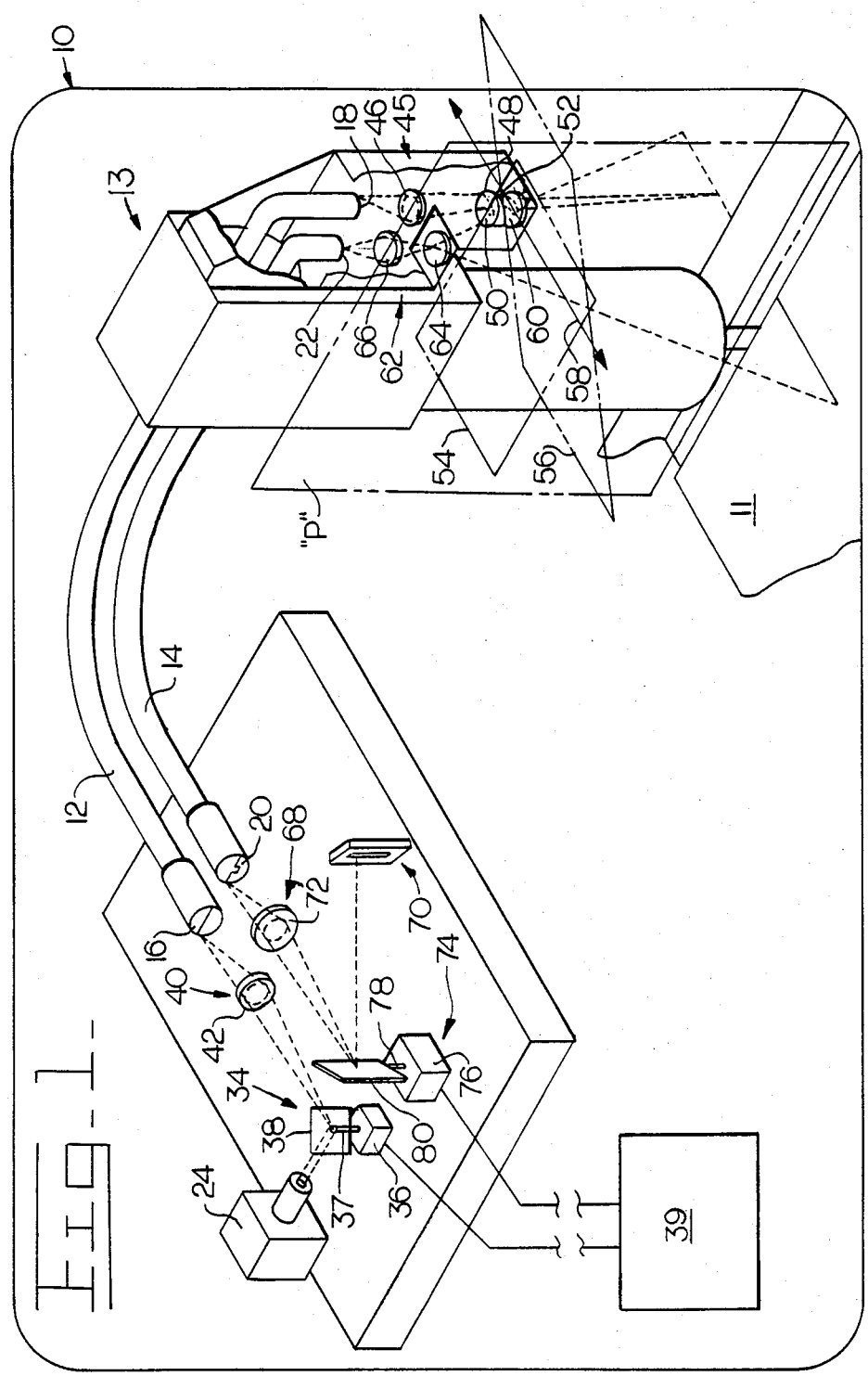

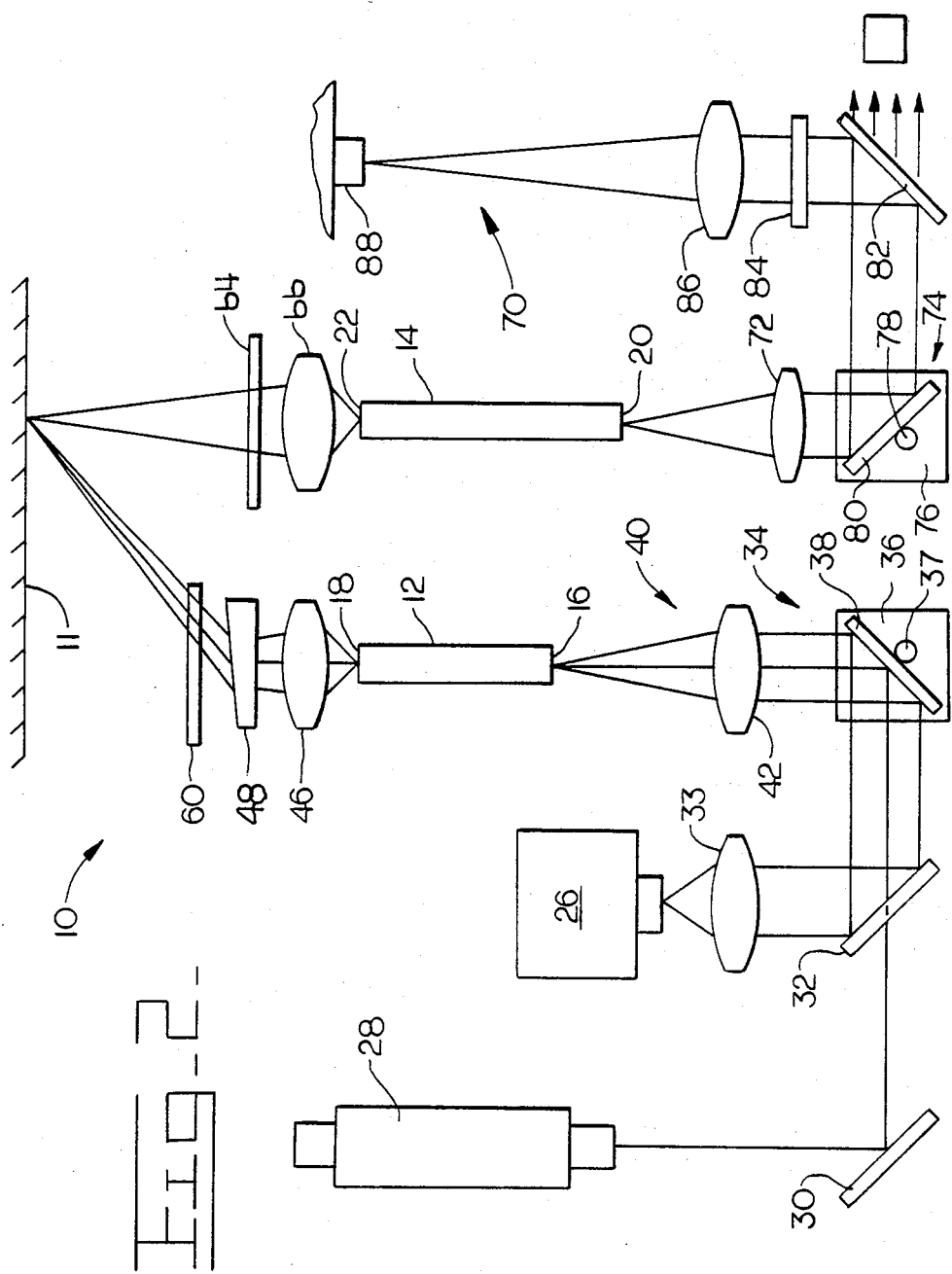

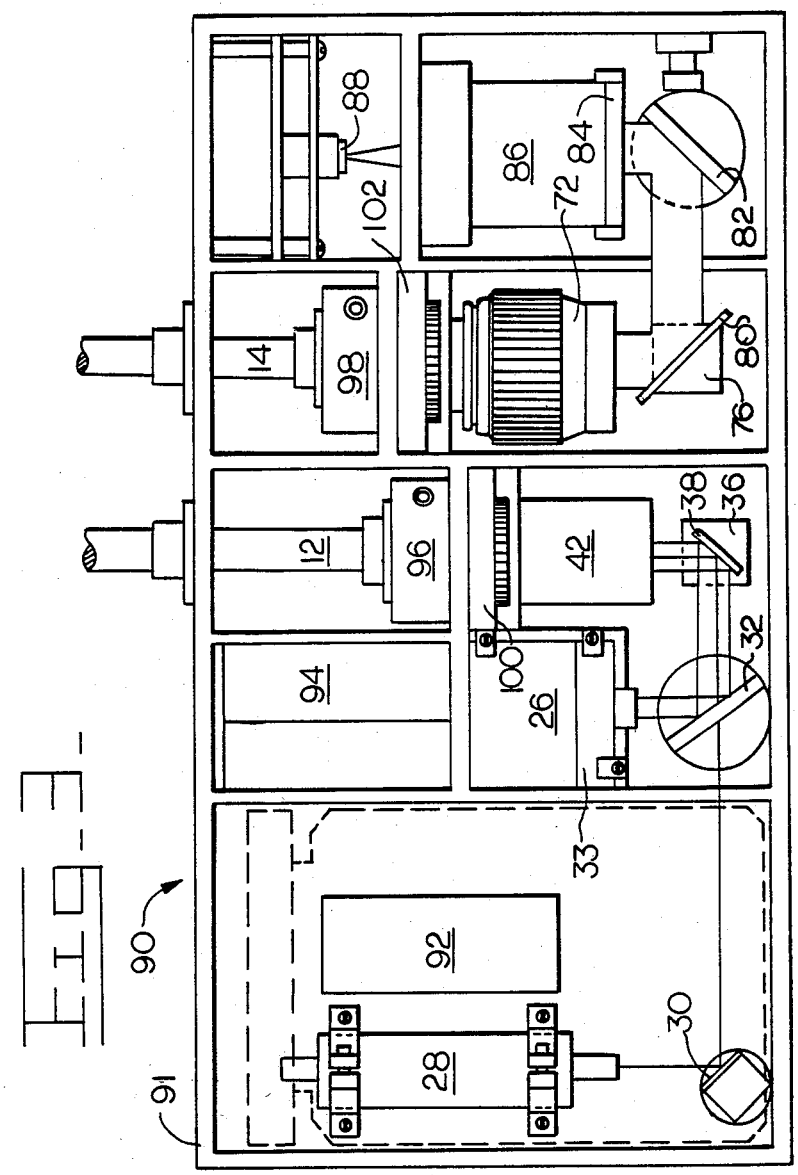

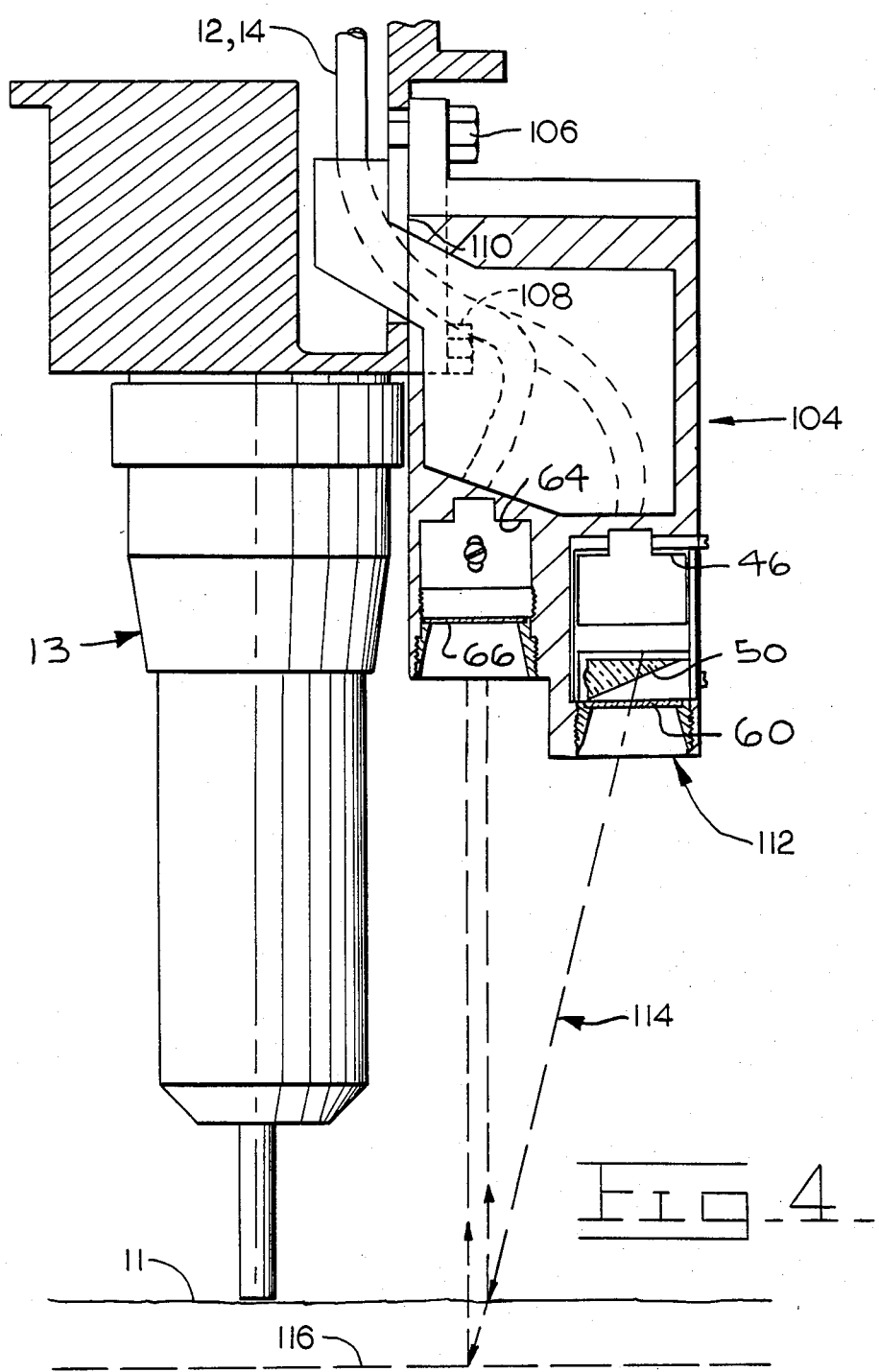

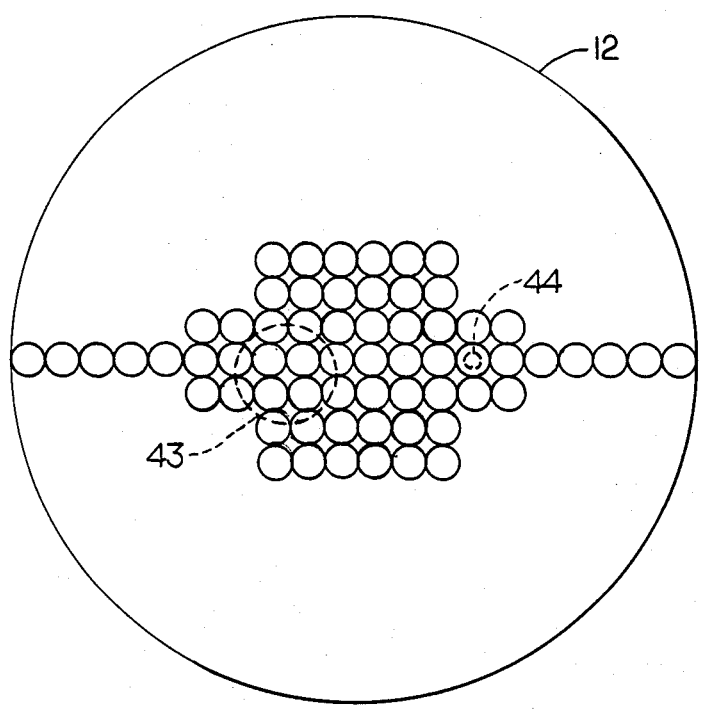

FIBER OPTIC SEAM TRACKING APPARATUS

TECHNICAL FIELD

This invention relates generally to an apparatus for detecting anomales on a workpiece surface, and more particularly, to a sensor for detecting weld groove depth, shape, and location.

BACKGROUND ART

In the field of vision based guidance systems, and more particularly, in the area of automated arc welding, sensor packing has become an area of vital importance and continues to frustrate attempts at developing a truly flexible automated welder. Current sensor design has developed to the point where the sensor itself is as slim as the torch bracket in one dimension, allowing the sensor to proceed the torch through any narrow opening which the torch alone could pass. However, as the first dimension is minimized, so too must the second and third dimensions be increased, thus reducing rotational capabilities as well as limiting how closely the torch may approach an obstacle. Use of this type of sensor on an automated welding system requires an operator to manually weld those inaccessible areas which are the most difficult to reach.

Maneuverability of the torch could be enhanced by moving the sensor to a more remote location, further removed from the welding torch. While this alternative would increase torch accessibility to confined areas, it is recognized that absent any special preparatory action, the reflection coefficient of the workpiece is highly variable and considerable energy density is required to insure that a spot of light is established. The amount of light received by the sensor is a function of the distance between the spot of light and the sensor, thus as the distance increases, more power is required from the light source. Increased power necessarily dictates an increase in physical size that very well may offset the maneuverability gained by moving the sensor further from the welding head.

Additional advantages can be found in removing the sensor from the extremely harsh environment of the welding torch. For example, special cooling considerations may not be necessary, electronic components, being especially sensitive to heat could be constructed from less costly solid state components, as the temperature extremes would be less drastic.

The present invention is directed to incorporating the advantages and overcoming the problems as set forth above.

DISCLOSURE OF THE INVENTION

In accordance with one aspect of the present invention, an apparatus is movable in a first direction along a plane "P" for optically detecting anomalies on a surface of a workpiece. The apparatus includes first and second fiber optic bundles, each having first and second ends, and a projected source of light. A first means receives the projected light and alters the path of the light wherein the light is scanned across the first end of the first fiber optic bundle. A second means images the light onto substantially a single fiber of the first fiber optic bundle. A third means receives the light from the second end of the first fiber optic bundle, images the light relative to the workpiece surface, and establishes a spot of light. A fourth means receives reflected light from the spot and images the light onto the second end of the second fiber optic bundle. A fifth means receives light from the first end of the second fiber optic bundle and images the light. A sixth means receives the light from the fifth means and delivers an electrical signal in response to the position of the light.

Known vision guidance systems are large, bulky devices which inhibit the mobility of, for example, welding equipment when affixed to the welding head. These guidance systems must necessarily be located in close proximity to the weld groove to insure that the reflected signal may be differentiated from the optical "noise" typically associated with a manufacturing environment and most notably emanating from the welding flash. The present apparatus is directed toward maintaining an acceptable energy density, such that removing the guidance system from the immediate area of the weld groove will not adversely affect the signal to noise ratio.

BRIEF DESCRIPTION OF THE DRAWINGS

FIG. 1 is a schematic diagram showing the relative positioning of the components of the present apparatus;

FIG. 2 is a schematic diagram illustrating the optical system of the present apparatus;

FIG. 3 is a cross-sectional view of the present apparatus;

FIG. 4 is a cross-sectional view of the sensor attached directly to the welding head; and, FIG. 5 is an end view of a fiber optic bundle.

BEST MODE FOR CARRYING OUT THE INVENTION

Referring now to the drawings, wherein the preferred embodiment of the present apparatus is shown, FIG. 1 illustrates an apparatus 10 movable in a first direction along a plane "P" for optically detecting anomales on the surface of a workpiece 11. FIG. 1 illustrates the apparatus 10 in approximate relationship to the welding head 13 and workpiece surface 11. FIG. 2 illustrates the optics of the apparatus 10 in greater detail, and a better appreciation of the instant invention may be had by referring to both FIGS. 1 and 2 in the following discussion.

The apparatus 10 includes first and second fiber optic bundles 12,14, each having first and second ends 16,18;20,22. A source of light 24 consists, for example, of a laser diode 26 and output optics projecting a 10 mm diameter of monochromatic light having a wavelength of 830 nanometers, a helium-neon (He-Ne) laser 28 projecting a 0.8 mm beam of monochromatic light having a wavelength of 628 nanometers, a first mirror 30 for orthogonally reflecting the He-Ne laser light, and a dichroic mirror 32 for passing the He-Ne laser light and orthogonally reflecting the laser diode light. Both the He-Ne and the diode light are collimated and substantially coaxially aligned with one another, though the laser diode 26 projects a diverging eliptical beam and must be collimated by, for example, a lens 33. A first means 34 receives the projected light and alters the path of the light by linearly scanning the light across the first end 16 of the first fiber optic bundle 12. The first means 34 includes a galvanometer 36 positioned intermediate the source of light 24 and the first end 16 of the first fiber optic bundle 12. The galvanometer has a shaft 37 angularly positionable relative to the first end 16 of the first fiber optic bundle 12 for varying the angle of incidence of the two collimated light sources 26,28 with a first mirror 38 fixedly attached to the galvanometer shaft. The galvanometer 36 oscillates the mirror 38 through an angle of 2° under control of a remote processor 39 by varying the amount of current delivered to the galvanometer 36. Varying the angle of incidence causes the light to be reflected in a plane intersecting a second means 40 which focuses the light onto substantially a single fiber of the first fiber optic bundle 12. The second means 40 includes a spherical lens 42 which has, for example, a 25 mm focal length and is positioned 25 mm from the fiber optic bundle 12. The combination of the 25 mm lens and the 830 nm light will image the 10 mm diameter laser light down to a diameter of approximately 4 microns, resulting in approximately 95% of the available power being delivered to a single 10 micron fiber. Further, in the event that a laser having a wavelength other than 830 nm is selected, an appropriate adjustment in the positioning and the focal length of the lens 42 will be required to obtain an image of similar dimensions.

Laser light is known to have a Gaussian distribution; thus, even a spot which has a 15 micron diameter coaxially imaged onto a 10 micron fiber transmits 70% of the available power through a single fiber. It has been discovered that a substantial portion of the light may be transmitted through a single fiber of the fiber optic bundle 12 by limiting the size of the spot imaged onto the fiber optic bundle. This is important to maintain the energy density of the transmitted light at a sufficiently high level to insure that the light reflected from the workpiece surface 11 is of adequate intensity to be differentiated from the "noise" generated by the arc flash of the welder. That is to say, a high energy density of the laser light is a key ingredient in sustaining a high signal to noise ratio.

Referring to FIG. 5, an end view of the fiber optic bundle 12 is illustrated and shows the individual fibers arranged in an orthogonal matrix. Laser light imaged onto the bundle 12 is indicated by the broken line 43 and has a diameter of approximately 30 microns. The image is shown to fall wholly on four fibers and partially onto eight separate fibers. These partially illuminated fibers will not maintain this partial illumination, but will allow the light to diverge and homogeneously illuminate the entire fiber. The light projected from the second end 18 of the fiber optic bundle will be significantly larger than the 30 micron input diameter. Additionally, the light lost in the spaces between the individual fibers becomes more significant as the diameter increases. Conversely, the present apparatus 10 will image laser light into a 4 micron spot illustrated by broken line 44. From the illustration it appears as though 100% of the light would be transmitted through a single fiber, but because laser light is effected by Gaussian distribution, only a finite amount of light will fall within a fixed diameter. As suggested previously, approximately 95% of the available energy is coupled into a single fiber. During construction of the apparatus 10, care is taken in aligning the fiber optic bundle such that the center points of one row of fibers all fall within the plane of light reflected by the oscillating mirror 38. This insures that the laser light is serially linked with each fiber in the row of fibers, allowing maximum energy to be transmitted to the workpiece surface 11.

Referring again to FIGS. 1 and 2, a third means 45 receives the light from the second end 18 of the first fiber optic bundle 12, images the light relative to a workpiece surface 11, and establishes a spot of light.

The third means 45 includes, for example, a spherical lens 46 positioned adjacent the second end 18 of the first fiber optic bundle 12 and a wedge prism 48 which has first and second surfaces 50,52 defined by first and second intersecting planes 54,56. The prism 48 is positioned adjacent the spherical lens 46 with the intersection of the planes 54,56 forming a line 58 substantially perpendicular to the plane "P". The wedge prism 48 is positioned to refract the light at a predetermined angle in a direction toward the welding head 13, positioning the line scan as close as possible to the welding head 13. Similar results could be achieved by positioning the fiber optic cable 12 and the spherical lens 46 at this same predetermined angle and projecting the light toward the workpiece surface without the aid of the wedge prism 48. However, the angular positioning would require that the lens 46 and cable 12 be moved further from the welding head 13, enlarging the packaging requirements of the means 45, and reducing mobility of the welding head 13. Further, a window 60 is positioned intermediate the workpiece surface 11 and the prism 48. The window 60 is provided to protect the optical surface of the prism 48 from weld splatter and is constructed from sapphire to take advantage of its extreme hardness. This hardness not only discourages the weld splatter from sticking to the window 60, but also, environmental conditions will ultimately result in the window 60 becoming occluded by the collection of particulates carried in the smoke generated by the welding process. Cleaning of the window 60 is, therefor, necessary on a regular basis, and absent the protective window hardness, much care would be required to avoid scratching the window 60. Over a period of time the optical transmissability of the window 60 would deteriorate to such a point that sufficient laser light would be unable to pass through the window 60 and establish a spot of light. Construction of the protective window 60 from sapphire allows the use of readily available cleaning agents (e.g., paper products) without affecting clarity.

The spot of light established on the workpiece surface 11 is reflected in all directions forming a hemisphere of light due to a highly variable coefficient of reflection. A portion of this reflected light is directed to and received by a fourth means 62 where it is imaged onto substantially a single fiber at the second end 22 of the second fiber optic bundle 14. The fourth means 62 includes, for example, a protective window 64, similar to the window 60, and a spherical lens 66. The spherical lens 66 is the counterpart to the spherical lens 46, one having the inverse imaging properties of the other and each being positioned the same distance from the ends 18,22 of their respective fiber optic bundles 12,14. These inverse imaging properties are employed to insure that, irrespective of the workpiece surface 11 being within the focal plane of the lens 46, the spot of light imaged onto the workpiece surface 11 will be imaged by the lens 66 into a diameter substantially equal to the internal diameter of a single fiber. For example, if the lens 46 is chosen to provide magnification of 20, then the lens 66 would provide magnification of 1/20. A spot of light formed on the workpiece surface 11 will have a diameter determined by its distance from the focal plane. The farther the spot of light is from the focal plane, the larger the diameter; however, because the lens 66 has the inverse imaging properties of the lens 46, then as the spot diameter grows as it moves away from the focal plane, the lens 66 counteracts the growth of the projected light and acts to return the diameter to the original diameter as received by the lens 46. This diameter is ideally the diameter of a single fiber, but aberrations in the lens prevent the diameter from being returned to its exact original dimensions and some blurring of the image will occur.

The reflected light is transmitted through the second fiber optic bundle 14 where a fifth means 68 receives the light from the first end 20 of the second fiber optic bundle 14 and images the light onto a sixth means 70 which delivers an electrical signal to the remote processor 39 in response to the position of the light. The fifth means 68 includes, for example, a collimating lens 72 positioned adjacent the first end 20 of the second fiber optic bundle 14. In one embodiment of the apparatus 10, a seventh means 74 receives light from the fifth means 68, scans the light in synchronization with the first means 34, and delivers the light to the sixth means 70. The seventh means 74 includes, for example, a second galvanometer 76 positioned intermediate the fifth and sixth means 68,70. The galvanometer 76 has a shaft 78 angularly positionable relative to the first end 20 of the second fiber optic bundle 14 in synchronization with the shaft 37 of the first galvanometer 36. A second mirror 80 is fixedly attached to and rotatable in unison with the shaft 78 through an angle of 8°, thereby reflecting the collimated light in a plane intersecting the sixth means 70. The 8° angular displacement of the mirror 80 compensates for the sharper swing induced by the collimating lens 72. The receive optics differ from the transmit optics in that the amount of light received is only a small portion of the amount of light transmitted; consequently, optical losses which could be considered inconsequential in the transmit optics become much more significant in the receive optics. For this reason, the collimating lens 72 is selected to have a relatively short focal length and a low F number allowing as much light as possible to be conveyed. However, short focal lengths and low F numbers increase the angular displacement of the collimated light delivered through the collimating lens 72. Thus, light which is transmitted through the 2° arc is received in an 8° arc. Both the galvanometers 36,76 are under direct control of the remote processor 39, making the adaptation of the second galvanometer 76 to traverse the 8° arc in synchronization with the 2° arc of the first galvanometer 36 a matter of software control.

A mirror 82 receives the light reflected by the galvanometer mirror 80 and orthogonally reflects the light through a bandpass filter 84 which has a 2 nm wide pass band. The filter 84 acts to pass only the 830 nm laser light and prevents any false signals from being generated by the "noise" of welding arc flash or any incidental light. The width of the bandpass filter pass band is selected to correspond to the wavelength of the projected laser diode light. Correspondingly, a change in the wavelength of the laser diode 26 must necessarily be associated with an appropriate change in the bandpass filter 84. A spherical lens 86 has, for example, a focal length of 50 mm and acts to image the filtered light on a silicon photo-diode line array 88. The diode line array 88 converts the imaged light into a digital signal representing which of the diodes in the array 88 is receiving the filtered light. Those skilled in the art of electronics and optical design will recognize that the oscillating mirror 80 could be replaced by a stationary mirror and a matrix diode array could be substituted for the line diode array 88. This system would, rather than descan the signal, allow movement in both the x and y coordinates which the remote processor 39 would interpret to extract topographical information about the workpiece surface 11.

FIG. 3 illustrates a portion of the apparatus 10, hereinafter referred to as the optical processor 90. The optical processor 90 is located on the welding robot, but remotely located from the welding torch. Variable current signals are delivered to the galvonometers 36,76 by the remote processor 39, which is preferably separate from the optical processor 90 and remote from the welding robot. The processor 39 contains within its memory a software routine for assimilating the digital signals provided by the line diode array 88, determining the weld groove width, depth, and location within the field of view. The processor 39 will, subsequently, provide control signals to the welding robot to control direction and speed of movement, wire feed rate, welding voltage, etc. The software control routines are not considered part of the present invention and, therefor, have not been disclosed in the instant application. Similarly, the welding robot is not considered to be part of the present invention and may take the form of any commercially available industrial robot.

The optical processor 90 is housed within a sealable container 91 for protecting the optics from the collection of airborne particulates abundantly present in manufacturing type environments. The HeNe laser 28 is fixedly attached to the container 91 along with a respective power supply 92. Collimated light from the HeNe laser 28 is reflected by the mirror 30 and passed through the dichroic mirror 32. The HeNe laser is not intended to affect the intensity of the light reflected from the workpiece surface 11, but is expected to provide a visible indication of the position of the invisible laser diode light. The laser diode 26 emits monochromatic light of 830 nm which is invisible to the naked eye. The laser diode 26 receives power from a power supply 94 and delivers light through the collimating lens 33 which is reflected by the dichroic mirror 32. The dichroic mirror 32 coaxially positions the HeNe and laser diode light such that any adjustments made to the apparatus 10 which affect the visible HeNe light must necessarily similarly affect the invisible laser diode light. The light from the dichroic mirror 32 is reflected by the scanning mirror 38 and imaged by the spherical lens 42 onto the fiber optic bundle 12. A jacking stage 100 is positioned about the spherical lens 42 and allows for fine focusing of the transmitted laser light by moving the lens 42 relative to the first end 16 of the first fiber optic bundle 12. Proper positioning of the lens segment formed by the scanned light such that it falls upon the proper chord 16 of the end 16 of the bundle 12 is effected by shimming the laser diode 26 to an appropriate height. A rotary stage 96 allows the fiber optic bundle 12 to be rotationally positioned, aligning the center points of a row of fibers with the line segment formed by the scanned light. The combined adjustability of the rotary and jacking stages (100,96) enables the scanned light to be transmitted along a single row of fibers, serially linking each individual fiber with the projected laser light. The adjustment process would be extremely difficult if the operator were unable to see the imaged laser light; however, commercially available infrared focused viewers will be used during the adjustment process making the 830 nm light visible.

The reception portion of the optical processor 90 also includes a rotary and jacking stage 98,102 to insure that the reflected light is generally swept in a plane perpendicular to the axis of rotation of the descanning mirror 80 and to allow for fine focusing of the received light. The collimating lens 72 receives the reflected laser light after it has been properly oriented by the rotary and jacking stages 98,102, and delivers collimated light to the oscillating mirror 80. The collimated light is then reflected off of mirrors 80,82, passed through the bandpass filter 84, and imaged by the spherical lens 86 onto the line diode array 88. The oscillating motion of the mirror 80 in synchronization with the oscillating mirror 38 acts to reflect the collimated light to a single location given that the light reflected from the workpiece remains at a given distance from the optical head. Displacement of the collimated light from the given location indicates that the workpiece surface 11 is a different distance from the optical head. The magnitude of the displacement indicates the distance between the optical head and the workpiece surface 11. For example, as the laser light is scanned across the workpiece surface 11, the light will fall into the weld groove and because the transmit and receive optics are angularly displaced from one another, the line segment formed by the laser light on the workpiece surface 11 will appear discontinuous. The points and magnitudes of the discontinuities indicate the location and the depth of the weld groove.

Referring now to FIG. 4, a portion of the apparatus 10, hereinafter referred to as the optical head 104, is shown in sectional view attached to the welding head 13 by bolts 106,108. The fiber optic bundles 12,14 enter the optical head 104 through a passage 110 and terminate within the optical head 104 adjacent the spherical lenses 46,64. Protective windows 60,66 are positioned adjacent a first end 112 of the optical head 104 and the wedge prism 50 is located adjacent the first protective window 60 intermediate the window 60 and lens 46. The optical path of the transmitted and reflected light is indicated by the dashed line 114, illustrating the principle of triangulation. Where variations in the height of the workpiece surface 11 occur, for example, in the weld groove shown as the dashed line 116, the reflected light traverses an alternate path and, correspondingly, illuminates an alternate fiber. Ultimately, a different diode in the photo diode line array 88 is illuminated, indicating to the remote processor 39 that the surface 11 of the workpiece has deviated by a preselected measurable amount.

The overall dimensions of the optical head 104 are shown to be 5 inches in height and projecting 2.5 inches from the welding head 13. The small size of the optical head 104 allows the welding head 13 to travel into confined areas, such as welding into dead ends where vertical obstructions would contact the optical head 104 before the welding head 13 could reach the end of the weld groove. Minimizing the optical head 104 reduces the quantity of weld groove which cannot be reached by the welding head 13; however, the small size of the optical head 104 allows the welding head 13 to be tilted at an angle sufficient for finishing the weld into the dead end area, virtually eliminating manual welding of dead end seams.

Industrial Applicability

In the overall operation of the apparatus 10, assume that the welding head 13 is positioned over a groove in a workpiece 11 and a robot is attempting to guide the welding head 13 along the groove under direction from a remote processor 39. The weld groove location is determined from information provided by the apparatus 10 in the form of digital electrical signals.

A light source 24 provides collimated monochromatic light to an oscillating mirror 38 which scans the light linearly across the end 16 of the first fiber optic bundle 12. The bundle 12 has been mechanically oriented such that the center line of the scanned light will substantially align the centers of a single linear array of individual fibers in the bundle 12. The height is transmitted out of the linear array of fibers at the second end 18 of the bundle 12 and imaged onto the workpiece surface 11. At any one instant in time a spot of light is formed on the workpiece surface 11, but over a period of time the spot is linearly scanned across 2.5 inches of the surface 11. A portion of the light reflected by the surface 11 is imaged onto the second end 22 of the fiber optic bundle 14 illuminating a preselected fiber in the bundle 14. The fiber being illuminated is determined by both the position of the spot within the linear scan and the distance of the spot from the optical head 13. The light is transmitted through the bundle 14, out the first end 20 of the second bundle 14, and onto an oscillating mirror 80. The mirrors 80,38 are oscillating in synchronization with one another such that the linear scan induced by the first mirror 38 is nullified by the second mirror 80. For example, if the workpiece surface 11 was perfectly flat, the light reflected by the second mirror would remain perfectly stationary, and illuminating the same photo diode in the photo diode array 88. Variations in the workpiece surface 11 will, therefor, be translated into a displacement of the light on the photo diode array 88. A different diode in the array 88 will be illuminated and provide a distinct electrical signal to the remote processor 39. The magnitude of the variations in the workpiece surface are directly proportional to the magnitude of the displacement of the light on the photo diode array 88. The digital signals delivered by the array 88 contain information on the surface configuration of the workpiece 11.

While the apparatus has been illustrated primarily in association with tracking of weld grooves, those skilled in the art of optical pattern recognition will observe that the apparatus 10 could be used in any type of system requiring visual identification. For example, the present apparatus 10 could be implemented to identify parts in a manufacturing process, especially their particular orientation, and provide this information to a manipulator for procuring the parts. Alternately, the same apparatus 10 could be used in quality control applications for visually inspecting manufactured parts to insure they fall within acceptable tolerances.

The present apparatus 10 is not intended to be limited to the applications exemplified here, but the examples are given merely to clarify the operation of the apparatus 10.

Other aspects, objects, and advantages of this invention can be obtained from a study of the drawings, the disclosure, and the appended claims.

I claim:

1. An apparatus movable in a first direction along a plane "P" optically detecting anomalies on the surface of a workpiece, comprising:
   first and second fiber optic bundles, each having first and second ends;
   a projected source of light;
   first means for receiving said projected light and altering the path of said light across said first end of said first fiber optic bundle;

second means for imaging said light onto substantially a single fiber of said first fiber optic bundle;

third means for receiving said light from said second end of said first fiber optic bundle, imaging said light relative to said workpiece surface, and establishing a spot of light;

fourth means for receiving reflected light from said spot of light and imaging said light onto substantially a single fiber of said second fiber optic bundle;

fifth means for receiving said light from said first end of said second fiber optic bundle and imaging said light; and, sixth means for receiving said light from said fifth means and delivering an electrical signal in response to the position of said imaged light.

2. The apparatus, as set forth in claim 1, including a seventh means for receiving light from said fifth means, scanning said light in synchronization with said first means, and delivering said light to said sixth means.

3. The apparatus, as set forth in claim 1, wherein said third and fourth means are both located substantially in said plane "P" and displaced one from the other.

4. The apparatus, as set forth in claim 1, wherein said first means includes:

a first galvanometer positioned intermediate said projected source of light and said first end of said first fiber optic bundle, said first galvanometer having a shaft angularly positionable relative to said first end of said first fiber optic bundle; and, a first mirror fixedly attached to said galvanometer shaft, said first mirror being rotatable in unison with said shaft and adapted to reflect said projected light in a plane intersecting said first end of said first fiber optic bundle.

5. The apparatus, as set forth in claim 2, wherein said seventh means includes:

a second galvanometer positioned intermediate said fifth and sixth means and having a shaft angularly positionable relative to said first end of said second fiber optic bundle in synchronization with said first galvanometer shaft; and, a second mirror fixedly attached to said galvanometer shaft, said second mirror being rotatable in unison with said shaft and adapted to reflect said light in a plane intersecting said sixth means.

6. The apparatus, as set forth in claim 1, wherein said third means includes:

a spherical lens positioned adjacent said second end of said first fiber optic bundle; and, a wedge prism having first and second surfaces defined by first and second intersecting planes, said prism being positioned adjacent said spherical lens with the intersection of said planes forming a line substantially parallel to said workpiece surface and substantially perpendicular to said plane "P".

7. The apparatus, as set forth in claim 5, wherein said sixth means includes a linear diode array positioned adjacent said second galvanometer along said reflected light plane.

* * * * *

UNITED STATES PATENT AND TRADEMARK OFFICE
CERTIFICATE OF CORRECTION

PATENT NO. : 4,614,868
DATED : September 30, 1986
INVENTOR(S) : Louis G. Alster

It is certified that error appears in the above-identified patent and that said Letters Patent are hereby corrected as shown below:

In the cover page:

After "(73) Assignee:", "Caterpillar Industrial Inc., Peoria, Ill." should be changed to --Caterpillar Inc., Peoria, Ill.--.

In the Specification:

Column 2, lines 37 & 38, please delete "anomales" and insert --anomalies--.

Signed and Sealed this

Thirteenth Day of January, 1987

Attest:

DONALD J. QUIGG

Attesting Officer

Commissioner of Patents and Trademarks